United States Patent [19]

Friedman

[11] Patent Number: 4,649,998

[45] Date of Patent: Mar. 17, 1987

[54] SAND CONSOLIDATION METHOD EMPLOYING LATEX

[75] Inventor: Robert H. Friedman, Houston, Tex.

[73] Assignee: Texaco Inc., White Plains, N.Y.

[21] Appl. No.: 881,368

[22] Filed: Jul. 2, 1986

[51] Int. Cl.$^4$ .................... C09K 17/00; E02D 3/12; E21B 33/138

[52] U.S. Cl. ................................................ 166/294

[58] Field of Search ............... 166/294, 295; 405/264; 523/130, 131

[56] References Cited

U.S. PATENT DOCUMENTS

| | | | |
|---|---|---|---|
| 2,121,036 | 6/1938 | Irons .................................. | 166/294 |
| 2,300,325 | 10/1942 | van Leeuwen .................. | 166/294 X |
| 3,158,210 | 11/1964 | Cannon et al. .................. | 166/294 X |
| 3,251,414 | 5/1966 | Willman .......................... | 166/294 X |
| 3,730,271 | 5/1973 | Gall .................................. | 166/294 |
| 4,028,897 | 6/1977 | Bennett ........................... | 166/295 X |
| 4,521,317 | 6/1985 | Candau et al. .................. | 166/294 X |

Primary Examiner—Stephen J. Novosad
Attorney, Agent, or Firm—Jack H. Park; Kenneth R. Priem

[57] ABSTRACT

This invention relates to a method of treating wells completed in subterranean formations containing unconsolidated sand particles, so as to form a permeable barrier which permits relatively free flow of liquids including petroleum therethrough while restraining the flow of sand particles into the wellbore. The method comprises formulating a water-external phase emulsion containing as the dispersed phase, an oil insoluble rubber, preferably a nitrile or carboxylated nitrile rubber. The emulsion also contains an ester such a ethyl mono chloroacetate or ethyl acetate and a dibasic acid such as ethylenediamine. The composition is injected into the formation. The ester hydrolyzes, reducing the pH which destabilizes the emulsion and causes the nitrile rubber to coat the sand grains. The strength of the rubber matrix binding the sand grains together is increased by cross-linking which is enhanced by the ethylenediamine. Other cross-linking additives including zinc sulfate and colloidal sulfur may also be incorporated into the formulation to increase the degree of cross-linking and hence the ultimate strength and durability of the rubber consolidated sand mass.

28 Claims, No Drawings

SAND CONSOLIDATION METHOD EMPLOYING LATEX

FIELD OF THE INVENTION

This invention pertains to a method for treating wells penetrating and completed in subterranean earth formations, and more particularly to a method for treating a portion of a petroleum-containing formation which also contains unconsolidated sand, immediately adjacent to the well so as to stabilize the unconsolidated sand and prevent migration thereof into the well. Still more particularly, this invention pertains to a method of treating such wells by introducing an aqueous latex emulsion containing an oil insoluble rubber and chemicals which triggers demulsification of the latex emulsion after it has been positioned in the portion of the formation to be treated, in order to form a flexible, permeable barrier by binding the sand grains together with the rubber.

BACKGROUND OF THE INVENTION

Recovery of formation fluids, especially petroleum from subterranean formations is frequently difficult when the subterranean formation is comprised of one or more incompetent or unconsolidated sand layers or zones. The sand particles in the incompetent or unconsolidated sand zones move or migrate into the wellbore during the recovery of formation fluids from that zone. During the production of petroleum from wells completed in formations containing unconsolidated sand, the movement of sand in the wellbore can cause the well to cease production of fluids therefrom after a relatively short period of time. The small sand particles plug small openings in sand restraining devices placed on the end of the production tubing in the wellbore such as screens or slotted liners. The accumulation of the sand along the small openings cause the production of fluid to be reduced or stopped altogether. Moreover, small sand particles often flow through the openings in the screens and are produced to the surface of the earth, where they cause considerable mechanical problems because of their abrasive nature, leading to early failure of pumps and other mechanical devices used in the production of petroleum.

Many techniques have been described in the prior art for preventing or decreasing the flow of sand into the well during the course of petroleum production, including sand screens, filters, perforated or slotted liners, incorporated in the well. These prior art techniques have been successful in limited instances, but are seldom entirely satisfactory for a number of reasons. The mechanical devices usually restrain only the larger sand particles that are not completely effective for the purpose of restraining or preventing the flow of fine particles from the formation into the well and ultimately to the surface. Such devices have a relatively small filter area and so tend to become plugged quickly. Furthermore, these devices are expensive and they interfere with various types of completion and workover operations which are routinely applied to producing oil wells.

Chemical compositions have been described in the literature which can be injected into subterranean formations to bond the sand grains together, using a resinous plastic material which forms a permeable mass within the formation itself immediately surrounding the portion of the formation from which fluid production is being taken. These methods usually involve injecting into the unconsolidated sand around a wellbore, a polymerizable, resinous material which is later caused to polymerize so as to consolidate the formation sand in order to form the desired fluid permeable mass which restrains the flow of sand particles. Numerous difficulties have been encounted in commercial application of these techniques, including the difficulty of achieving even polymerization of the resinous material to the degree necessary to consolidate the sand particles while still maintaining the necessary permeability so the petroleum or other fluids may pass freely through the consolidated mass. Furthermore, these materials are expensive. In addition, the resinous plastic materials form a rigid mass which is easily fractured or cracked by mechanical stresses such as those induced by natural seismic forces, or those induced by mechanical activities associated with well completions, or by the application of pressure to a formation during the course of an enhanced recovery operation. Fractures of the consolidated sand mass open channels of flow which allow sand particles to be carried into the well with the detrimental results described above.

In view of the foregoing discussion, it can be appreciated that there is a substantial, unfulfilled need for a method for consolidating unconsolidated sand in subterranean petroleum containing formations to form a permanent, permeable barrier which allows the passage of fluids through the barrier while restraining the movement of sand, while retaining sufficient flexibility so fractures or other mechanical damage to the barrier do not result when the consolidated mass is subjected to forces such as those discussed above.

SUMMARY OF THE INVENTION

I have discovered that a strong and flexible permeable mass may be formed in the portion of an unconsolidated sand and petroleum-containing formation, immediately adjacent to a well penetrating the formation, which mass is sufficiently permeable to permit passage of petroleum or other formation fluids therethrough, and yet the flow channels in the permeable mass can be made sufficiently small to restrict the flow of unconsolidated sand or other mineral particulate matter from the formation into the well. Moreover, the mass is less fragile and brittle than that achieved when polymerized resinous materials are used, and so is less likely to be affected by mechanical shear forces. The material used to form the permeable mass according to the process that constitutes my invention, is a relatively dilute water-external phase emulsion of an oil-insoluble rubber. The preferred rubber for use in this application is a nitrile rubber which is a copolymer of butadiene and acrylonitrile. The especially preferred nitrile rubber is one known as a carboxynitrile rubber, in which one or two monomers of acrylic acid are incorporated per 100 units of the butadiene-acrylonitrile copolymer. A fluid comprising a water external emulsion containing from 6 to 15 and preferably from 8 to 12% by weight of the above described oil insoluble nitrile rubber as the dispersed phase is formulated, the fluid also containing a material which will cause the emulsion to break after it has been exposed to formation temperatures for a period of at least several hours. Preferred materials for this purpose are ethylacetate or ethylmonochloroacetate mixed with ammonium acetate. In one preferred embodiment, a cross linking agent such as a diamine, preferably ethylenediamine, is also incorporated in the fluid. This fluid is injected into the formation in a volume sufficient to saturate the pore space of the formation for a distance up to 4 and preferably 2 feet away from the wellbore, and allowed to remain undisturbed in the formation for at least 15 and preferably at least 24 hours. The resultant rubber coated sand forms a fluid permeable barrier around the wellbore which is effective for formation conditions up to about 300° F. and is quite stable with time.

DETAILED DESCRIPTION OF THE INVENTION AND DESCRIPTION OF THE PREFERRED EMBODIMENT

The process of my invention involves injecting a fluid into unconsolidated sand in a petroleum-containing formation immediately adjacent to a wellbore, said fluid being a water external emulsion containing an oil-insoluble rubber, preferably a nitrile rubber in the dispersed phase, and a material dissolved in the aqueous phase which causes the emulsion to break after it has been in the formation for several hours, leaving the nitrile rubber free to coat the sand grains immediately adjacent to the formation. In many formations, the sand naturally present in the formation may be utilized to form the barrier by contacting it with the treating fluid according to the process described herein. This is the preferred embodiment whenever the sand quality is sufficient to permit its use in forming the consolidated sand mass in the formation adjacent to the wellbore. In some applications, the subterranean formation does not contain sand which is suitable for use in forming the permeable barrier according to my process, either because of the relatively low sand content of the formation, or its particle size or other characteristics make it unsuitable for use in the sand consolidating process. In this instance, it may be necessary to enlarge the diameter of the wellbore and introduce good quality sand or other granular material to form an unconsolidated sand mass in the formation, which can then be treated with the latex emulsion. In one embodiment of the process of my invention, a minor portion of the formation adjacent to the well is removed either by flushing with water or mechanically underreaming the well in order to form a uniform cavity larger than the original wellbore. After a suitable amount of formation material has been removed, a tubing string or other injection means is placed in the well and sand is slurried with a suitable fluid and pumped into the wellbore. The sand particles are filtered from the slurry with the aqueous component of the slurry passing into the formation, thereby forming a pack or filter cake of unconsolidated sand which can be treated in accordance with my process to form the permeable barrier around the well.

Whenever possible, it is preferred to utilize the sand present in the formation. If core samples are obtained during the well drilling operation indicate that the sand particles are coated with or contain appreciable amounts of fairly viscous components of crude oil, it is advisable to flush the naturally occurring sand with a suitable fluid to remove these contaminates prior to injection of the latex emulsion according to my process. This can be accomplished by injecting light hydrocarbon solvent such as diesel oil or even a light crude oil into the formation, which dissolves the more viscous or solid crude components from the sand grains, leaving the grains more amenable to subsequent treatment with the latex emulsion.

The latex emulsion should be formulated in a relatively diluted concentration. The concentration of rubber in the treating emulsion is critical to the success of this invention. If the rubber content is too low the sand grains are incompletely coated and insufficient bridging between the grains occurs to develop the desired strength. If the concentration of rubber is too high, the permeability of the treated material will be insufficient to permit fluid flow from the formation into the well after completion of the sand consolidation process. Latex is ordinarily acquired from suppliers in a form in which the discontinuous, rubber hydrocarbon phase constitutes about 50% of the emulsion, and for the purpose of my invention, this should be diluted about 5-1. The preferred rubber content of the emulsion utilized in the process of my invention is from 6 to 15 and preferably from 8 to 12 percent by weight.

The rubber that is emulsified to form the latex or emulsion treating solution of my invention must be one which is oil insoluble. Any rubber that can be formed into an emulsion, and which is insoluble in oil or other hydrocarbons after the demulsification step may be utilized in my invention. Nitrile rubber is a preferred oil insoluble rubber for use in the process of this invention. Nitrile rubber is a copolymer of butadiene:

$$CH_2=CH-CH=CH_2$$

and acrylonitrile

$$CH_2=CH-C\equiv N$$

Nitrile rubber such as those discussed above are routinely used where oil resistance is required, such as in the making of gaskets and other materials. Another nitrile rubber which is especially useful in the process of my invention is a carboxy nitrile rubber, in which one or two acrylic acid monomers having the formula given below are incorporated per 100 units of the above-described butadiene-acrylonitrile copolymer:

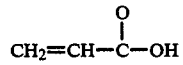
$$CH_2=CH-\overset{\overset{\displaystyle O}{\|}}{C}-OH$$

These carboxy nitrile rubbers provide the desired oil insoluble rubber component, and the presence of the acrylic acid randomly disbursed through the chain improves the cross linking characteristics of the rubber which improves the mechanical strength of the rubber matrix.

In addition to the above described nitrile rubber, which will constitute the dispersed or discontinuous phase of the emulsion which is utilized in the process of my invention, the continuous phase comprises water to which is added the following materials.

It is desired that there be present in the treating composition, a material which has relatively little effect on the emulsion while it is formulated and stored on the surface and injected into the well, but which will cause destabilization of the emulsion after it has been present in the formation for a few hours. I have discovered that this can be accomplished by incorporating an ester into the treating fluid, which ester hydrolyzes at temperatures above surface ambient temperature but within the range of temperatures experienced in subterranean formations. Hydrolysis of the ester forms an acid which lowers the pH of the latex and causes the emulsion to break, causing a "creaming" effect which allows the rubber to deposit on and coat the sand grains. The demulsification results from the fact that emulsions are formed and stabilized by the use of surface active agents or soaps which maintain the dispersed rubber in colloidal form. The soaps are destroyed or rendered insoluble by contact with acid, which causes demulsification, which is necessary for the rubber to coat the sand grains to form the sand consolidating barrier. Numerous esters were investigated for this purpose, and it was found that ethyl acetate was an especially preferred ester for accomplishing the formation temperature triggered demulsification. Ethyl acetate hydrolyzes at reservoir temperatures to yield acetic acid and ethyl alcohol, and it is the acetic acid which lowers the pH of the emulsion and causes demulsification to occur. Ethyl monochloroacetate may also be used and I have found that ammonium acetate in combination with ethyl monochloroacetate is especially effective. Any other material which hydrolyzes at formation temperatures to yield an acid may be employed as the trigger which releases the rubber from emulsion so it may coat the sand grains after the fluid has been injected into the formation.

After the rubber has been released from the latex emulsion, it coats the sand grains and forms bridges with adjacent rubber coated sand grains to form a mechanically stable matrix. Cross linking between the nitrile rubber monomers also occurs, which improves the physical strength of the consolidated rubber mass. In a preferred embodiment, therefore, the composition injected into the formation according to the process of my invention also contains as a cross linking additive, a diacidic base such as a diamine, preferably ethylenediamine. It is postulated that the basic ends of the diamine react with adjacent carboxylic acid groups to provide cross linking, strengthening the rubber film.

According to certain of this broader aspects, then, application of the process of my invention involves forming an emulsion in which water is the external phase and a nitrile rubber, preferably a carboxy nitrile rubber hydrocarbon constitutes the dispersed or discontinuance phase, the rubber content being from 6 to 15 and preferably from 8 to 12 percent of the emulsion. Dissolved in the aqueous external phase is from 12 to 18 and preferably from 14 to 16 percent by weight of the material which hydrolyzes at formation conditions, reducing the pH of the emulsion and causing destabilization thereof, which releases the dispersed rubber so it can coat the sand grains. Esters are the preferred agent for this purpose, and the especially preferred ester is ethyl acetate. The aqueous component of the fluid also contains in its preferred embodiment a cross linking agent, preferably a diamine with ethylenediamine being the especially preferred agent for this purpose. The concentration of the diamine cross linking agent in the emulsion is from 0.5 to 1.5 and preferably from 0.9 to 1.1 percent by weight. The emulsion also contains sufficient soap or other surface active agent to stabilize the emulsion, however, this material is usually present in the commercial latex from which my treating fluid is prepared, so no additional surface active agent need be added in forming the treating fluid of my invention from commercial latex formulations.

The volume of latex emulsion prepared for use in the process of my invention should be sufficient to completely saturate the pore space in the formation adjacent to the wellbore for a distance up to 4 and preferably up to 2 feet into the formation. In effect, a treated zone is created equivalent to a hollow cylinder whose outside diameter is up to 2 to 4 feet and inside diameter is equal to the diameter of the well drilled into the formation. The height of the cylinder is determined by the thickness of the petroleum-containing formation in which the barrier is to be formed.

As discussed previously, when it is desired to consolidate sand already present in the formation, if it is determined from core samples during the course of drilling the well that the sand particles are contaminated with appreciable amounts of high viscosity crude oil or solid hydrocarbon materials such as components of the crude oil present in the formation, it may be necessary to employ a pretreatment process prior to introduction of the above described latex treating composition in order to remove the contaminates from the sand grains. Diesel oil or any other liquid hydrocarbon may be employed for this purpose, and it is generally sufficient if an amount of cleaning fluid, e.g. diesel oil, is injected to saturate about the same volume as will be treated with the latex emulsion.

The latex emulsion is injected into the formation, and may be displaced with sufficient volume of water or other fluid to ensure that none of the emulsion remains in the injection string, so no blockage of the injection string will occur. The well is then shut in and the injected latex is allowed to remain essentially undisturbed in the formation for a sufficient time for demulsification to occur and for at least a limited amount of cross linking of the rubber to occur. Using the ester triggering agents described above, it is generally sufficient if the fluid is allowed to remain in the formation for a period of at least 15 and preferably 24 hours prior to commencing production of fluids from the well. Since no harmful effects result from leaving the material in the formation for periods of time in excess of those described above, it is preferable to leave the fluid in the formation as long as is reasonable under the operating conditions present, in order to ensure complete reaction of the injected materials.

In another embodiment of the process of my invention, from 0.05 to 0.15 and preferably from 0.08 to 0.09 percent by weight zinc sulfate is incorporated in the emulsion prior to its injection into the formation. This accomplishes a type of vulcanization of the rubber, which improves its strength somewhat. Colloidal sulfur may also be incorporated in the emulsion, which causes further cross linking of the nitrile rubber similar to that used in vulcanization of rubber products. In this embodiment, from 0.05 to 0.15 and preferably from 0.09 to 0.11 percent by weight of colloidal sulfur is incorporated in the emulsion prior to its injection into the wellbore.

I have also discovered that sodium chloride incorporated in the emulsion used in the process of my invention is sometimes helpful in the demulsification stage. Sodium chloride decreases the stability of the emulsion somewhat because it reduces the solubility of the surface active agent, thereby making the latex emulsion more responsive to the effect of acid produced by hydrolysis of the ester in the formation. The amount must be determined experimentally since it is a function of the concentration and type of surface active agent used.

In yet another variation of the process of my invention, a post-flush my be utilized to further enhance the cross linking within the nitrile rubber, which improves the strength of the resultant latex consolidated sand mass. Examples of materials which may be utilized in the post-flush treatment are zinc sulfate solution or other water soluble vulcanizers well known in the art of rubber manufacture.

EXPERIMENTAL SECTION

The following experimental work is offered to support the operability and demonstrate the preferred embodiments for use in the process of my invention. The rubber latex used in the experiments was Hycar 1561 manufactured by B. F. Goodrich Company. Hycar is a high nitrile artificial rubber used to manufacture oil resistant gaskets, among other things.

The first phase of the experimental work produced a preferred combination of ingredients designed to cause demulsification of the latex to be heat triggered at reservoir temperature, causing the latex to demulsify, the rubber coats the sand grains, after which the rubber monomers cross-link. These ingredients included Hycar, water, ammonium acetate, ethyl monochloroacetate and ethylenediamine, added in the order listed. When the temperature was increased, hydrolysis of the ammonium acetate and subsequent transesterificate with the ethyl monochloroacetate and ammonium acetate cause the pH to drop. The acidity of the solution caused the latex to demulsify and release the rubber which coats the sand grains. Cross-linking of the rubber is effected by the ethylenediamine. Examples of combinations which were stable at room temperature and demulsified at 150° F are shown in Table 1. These variations of the formula were used in sand pack tests.

TABLE 1

| | Latex Emulsion Composition | | | | |
|---|---|---|---|---|---|
| Sample No. | Hycar ml. | Water ml. | Ammonium Acetate ml. | Ethyl Chloroacetate ml. | Ethylene Diamine ml. | Latex Solids wt. % |
| 1 | 9.90 | 30.20 | 5 | 2 | 2 | 8 |
| 2 | 12.25 | 27.75 | 5 | 2 | 2 | 10 |
| 3 | 18.35 | 21.62 | 5 | 2 | 2 | 15 |
| 4 | 23.50 | 16.50 | 5 | 1 | 1 | 20 |
| 5 | 29.40 | 10.60 | 5 | 1 | 1 | 25 |

For the second phase of the experimental work, five sand packs were made in 18" long and 2¼" inside diameter stainless steel tubes. The tubes were packed with 20–30 mesh solvent cleaned core material, which came from Lloyd 235 well in the interval 6736'–6738' in the Ventura Avenue Field. The packed tubes were evacuated with a vacuum pump and charged with a 3% salt solution. Pore volumes and permeabilities were determined. Then into each tube, one and one-half pore volumes of one of the solutions in Table 1 was injected, the tube closed and placed in the oven at 150° F. overnight. The tubes were allowed to cool and the permeabilities were remeasured. The results are given in Table 2, All the samples shown were firmly consolidated. A run made with a 5% solids mixture did not effect consolidation.

TABLE 2

| Permeability retention of Latex Consolidations | | | | |
|---|---|---|---|---|
| Sand Pack | Latex Solids In Mix - Wt. % | Permeability | | |
| | | Original d. | Final d. | % Retention |
| 1 | 8 | 10.6 | 8.6 | 81.1 |
| 2 | 10 | 10.9 | 8.7 | 79.8 |
| 3 | 15 | 10.6 | 5.3 | 50.0 |
| 4 | 20 | 10.5 | 1.0 | 9.7 |
| 5 | 25 | 10.7 | 0.65 | 6.1 |

The above data clearly indicates that a consolidated, permeable mass may be formed by injecting the latex emulsion of my invention into unconsolidated sand and allowing it to demulsify, which causes the sand grains to be coated with rubber, followed by cross-linking sufficient to enhance the strength of the rubber matrix binding the sand grains together.

Extensive testing of variations and the latex used, as well as the concentration of this and the other additives, has identified the following especially preferred composition for a fluid to be used in the process of my invention.

| 106 ml | Hycar 1571 × 88 | Goodyear carboyxlated nitrile latex. This is about 42% solids. |
|---|---|---|
| 254 ml | Water | Total water requirement |
| 5 ml | Ethylene Diamine | Cross linking agent |
| 70 ml | Ethylene Acetate | The trigger ester |
| 4.5 g | Sodium Chloride | Cure improver. |
| 0.39 g | Zinc Sulfate | Dissolved in 100 ml of the water along with the following ingredients |
| 2 g | Colloidal Sulfur | Further improves cross linking. |

Use of the above formulation in a sand pack in which the fluid was left in the pack for 15 hours at 180° F. gave a resultant permeability of 3.9 darcies in a 100–150 mesh sand pack.

FIELD EXAMPLES

For the purpose of ensuring complete disclosure and compliance with requirements of disclosing the best mode, the following field example is offered. A well is drilled into a subterranean petroleum containing formation, and completed at an interval from 4520 to 4560 feet, the interval being 40 feet in thickness measured vertically. The mineral matrix of the formation is essentially all unconsolidated sand, so the sand naturally present in the formation may be utilized in the process of my invention. The sand grains do contain residual viscous or solid hydrocarbon materials on them, and for the purpose of ensuring good contact between the rubber and the sand grains, a preflush is used. Since it is desired to saturate the pore space of the formation, whose porosity is approximately 30%, for a distance about 3 feet into the formation, the following volume of diesel oil will be required for the preflush.

$$0.30 \times 40 \times 3.1416 \times (3)^2 = 339.29 \text{ cu.ft. or 2,538 gal. Diesel Oil}$$

After the above described volume of diesel oil has been injected into the formation, the treating fluid for my process is formulated. Approximately 2,500 gallons of fluid is utilized, and the following amounts of the indicated material are mixed to form the desired emulsion.

| 604 gal. | Hycar Carboxylated Nitrile Latex |
|---|---|
| 1,472 gal. | Water |
| 29 gal. | Ethylenediamine |
| 405 gal. | Ethyl Acetate |
| 19 lbs. | Zinc Sulfate in 675 Gallons of Water |
| 25 lbs | Colloidal Sulfur |

The above materials are blended well to form a homogenous emulsion and injected into the formation. This is followed by approximately 6,000 gallons of water, sufficient to displace the latex treating composition from the tubing. The well is then shut in and the injected fluid allowed to remain in the formation for approximately 24 hours. The well is then put on production and it is determined that good oil production rates are obtained with essentially no sand being present in the produced fluid.

While my invention has been described in terms of a number of illustrative embodiments, it is clearly not so limited since many variations thereof will be apparent to persons skilled in the related art without departing from the true spirit and scope of my invention. It is my intention that my invention be limited only by those limitations and restrictions imposed in claims appended immediately hereinafter below.

What is claimed:

1. A method of treating a subterranean, unconsolidated sand and petroleum containing formation penetrated by at least one well, which is in fluid communication with at least a portion of the unconsolidated sand containing subterranean formation, in order to form a flexible, permeable barrier around the well which restrains the movement of sand particles into the well while permitting the passage of formation fluids including petroleum there through, comprising:
   a. forming a predetermined quantity of a treating fluid comprising a water external phase emulsion having as its dispersed or discontinuous phase, a predetermined amount of an oil-insoluble rubber, said emulsion also containing a predetermined quantity of a material which hydrolyzes at reservoir temperature to form an acid;
   b. injecting the treating fluid into the formation to be consolidated; and
   c. leaving the fluid undisturbed in the formation for a predetermined period of time sufficient to allow the emulsion to break so the oil insoluble rubber coats the sand grains, forming a competent permeable barrier around the wellbore.

2. A method as recited in claim 1 wherein the oil insoluble rubber is a nitrile rubber.

3. A method as recited in claim 1 wherein the oil-insoluble rubber is an acrylonitrile rubber.

4. A method as recited in claim 2 wherein the nitrile rubber is comprised of polymers of butadiene and acrylonitrile.

5. A method as recited in claim 3 wherein the nitrile rubber includes from one to two acrylic acid monomers per 100 butadiene-acrylonitrile monomers.

6. A method as recited in claim 1 wherein the concentration of oil insoluble rubber in the emulsion is from 6 to 15 percent by weight.

7. A method as recited in claim 1 wherein the concentration of oil insoluble rubber in the emulsion is from 8 to 12 percent by weight.

8. A method as recited in claim 1 wherein the hydrolyzable material is a low molecular weight ester.

9. A method as recited in claim 8 wherein the ester is ethyl monochloroacetate used with ammonium acetate.

10. A method as recited in claim 8 wherein the ester is ethyl acetate.

11. A method as recited in claim 8 wherein the concentration of ester is from 12 to 18 percent by weight.

12. A method as recited in claim 8 wherein the concentration of ester is from 14 to 16 percent by weight.

13. A method as recited in claim 1 wherein the emulsion also contains a cross-linking agent.

14. A method as recited in claim 13 wherein the cross-linking agent is a diamine.

15. A method as recited in claim 14 wherein the diamine is ethylenediamine.

16. A method as recited in claim 13 wherein the concentration of cross-linking additive is from 0.5 to 1.5 percent by weight.

17. A method as recited in claim 13 wherein the concentration of cross-linking additive is from 0.9 to 1.1 percent by weight.

18. A method as recited in claim 1 wherein the emulsion also contains sodium chloride.

19. A method as recited in claim 1 wherein the emulsion also contains from 0.05 to 0.15 percent by weight zinc sulfate.

20. A method as recited in claim 1 wherein the emulsion also contains from 0.08 to 0.09 percent by weight zinc sulfate.

21. A method as recited in claim 1 wherein the emulsion also contains from 0.05 to 0.15 percent by weight colloidal sulfur.

22. A method as recited in claim 1 wherein the emulsion also contains from 0.09 to 0.11 percent by weight colloidal sulfur.

23. A method as recited in claim 1 comprising the additional step of treating the formation, prior to injecting the emulsion, to remove residual hydrocarbon materials from the sand grains by injecting an oil soluble fluid into the formation.

24. A method as recited in claim 23 wherein the oil soluble fluid is diesel oil.

25. A method as recited in claim 1 wherein the volume of fluid injected into the formation is sufficient to saturate the pore space of the formation adjacent the well for a distance of up to 4 feet from the wellbore into the formation.

26. A method as recited in claim 1 wherein the volume of treating fluid injected into the formation is sufficient to saturate the pore space of the formation adjacent to the well for a distance of up to 2 feet from the wellbore into the formation.

27. A method as recited in claim 1 wherein the treating fluid is left in the formation for at least 24 hours prior to resuming production fluids from the formation.

28. A method as recited in claim 1 wherein the treating fluid is left in the formation for at least 15 hours prior to resuming producing fluids from the formation.

* * * * *